UNITED STATES PATENT OFFICE 2,403,408

PRODUCTION OF THICKENED PRODUCTS FROM FATTY ACID ESTERS

Paul Stamberger, Dover, Del.

No Drawing. Application January 11, 1943,
Serial No. 472,022

11 Claims. (Cl. 106—254)

This invention relates to the production of thickened masses or films from esters of long chain fatty acids by a process of oxidation. The masses or films produced may be of sticky consistency or may have solidifying properties, or may be solid, depending on the materials and treatment employed.

The invention is especially adapted to effecting the oxidation of the esters in aqueous dispersions or emulsions.

The present application is a continuation-in-part of my copending application, Serial No. 465,636, filed November 14, 1942. As is mentioned in said co-pending application, it is well known that drying and semi-drying oils can be thickened and ultimately solidified by oxidation. This has frequently been done by blowing the oil, usually at elevated temperature, with an oxygen containing gas, such as air, whereby the thickening and solidifying takes place. Such an oxidation is a relatively slow process which can only be controlled with difficulties and requires considerable skill. It is believed that such an oxidation reaction takes place on the interface of the oil and the gas. The products of such an oxidation dissolve in the oil below such an interface (which oil is still unchanged) and the oxidation products thereby form a colloidal solution. This process continues until all the oil is transformed into a mass containing a large quantity of oxidized products. The velocity of such a reaction may be increased by enlarging the surface of the drying oil in contact with the oxygen. This may be effected either by spreading the oil into a thin film or by dispersing the oil in a medium, for example, by producing a dispersion or emulsion of the oil in water with small dispersed particles. For this purpose the best particles are of one micron or less diameter.

The present invention is based on the discovery that esters of unsaturated fatty acids formed with polyvalent alcohols are oxidized remarkably easily in the presence of hydrogen peroxide; and further, on the observation that hydrogen peroxide itself is a very effective oxidizing agent for such unsaturated fatty acid esters, when the hydrogen peroxide is used in the presence of catalysts.

According to the present invention such a process is used to thicken and even to solidify natural or modified fatty oils or other natural or synthetic esters containing unsaturated fatty acids, and to produce therefrom solidifiable, sticky, or solid masses suitable respectively as film coatings, adhesives, and the like. It was found that when hydrogen peroxide is brought in contact with drying oils and similar products in the presence of suitable catalysts, the solidification of the oil will take place within a very short time even throughout a mass of considerable thickness or size, and that when producing films of a few millimeters thickness, it is not necessary to increase the surface of the oil to be oxidized to the extent required for oxidation with oxygen or oxygen containing gas.

For the process which is the subject of the present invention, it is essential that a non-gaseous oxidizing agent, capable of being brought in solution, is used and that such agent decomposes without leaving a non-volatile residue. Thus hydrogen peroxide and solutions of hydrogen peroxide may be employed. It is further an important feature to use such amounts of the oxidizing agent that an approximate saturation, or complete saturation of the fatty acid esters with the oxygen without decomposition of the oil, is attained, this being accompanied by a spontaneous solidification of the oil.

It is still further of importance that the oxidation be carried out in the presence of catalysts, so that the oxidation may be effected at low temperatures, even at room temperature, (that is about 10°–40° C.) In this way solid products may be formed even at room temperature. In such a process the presence of catalysts accelerates the oxidation, and in addition, the nature and quantity of catalysts otherwise influence the oxidation process. A product, the oxidation of which is carried out to the extent above mentioned, without decomposition of the fatty acid esters, has different and advantageous properties, as compared with products obtained by a different degree of oxidation.

In carrying out the process in the presence of catalysts, it is possible to influence the reaction to such an extent that a spontaneous and very rapid solidification of the fatty acid esters will take place. In using hydrogen peroxide as the oxidizing agent, various known metallic catalysts, consisting of heavy metals may be employed with definite advantage, since these catalysts are activated by the hydrogen peroxide. Such catalysts, in fact, manifest far greater activity when used with hydrogen peroxide, than when used with other oxidizing agents (for example, oxygen gas).

It is an advantage of the process that it can be used in a very simple and effective manner to carry out oxidation of dispersions and emulsions of drying oils or materials containing drying oil fatty acids, the oxidation being very effective even in coarse dispersions with particle size of 6 microns and larger. With hydrogen peroxide the oxidation is completed in very short time and a dispersion of solid products can easily be obtained. No ions are added or formed by the decomposition of hydrogen peroxide, and its use has no adverse effect on the properties and stability of the emulsion.

The advantage of the process which is the subject of the present invention may be demonstrated by the following experiment: 50 grams of water, and 50 grams of an aqueous hydrogen peroxide solution of 30 volume per cent concentration are placed in two separate flasks. 20 grams of tung oil in which 0.3 gram of cobalt is dissolved are poured over each of these liquids forming a film of 10 millimeters thickness. Within a few minutes a solid film formation can be observed in the flask containing hydrogen peroxide and in two hours time the entire oil film is transferred into a solid dry mass. The reaction is accompanied by heat evolution but no formation of oxygen gas could be observed. In the other flask where the tung oil was placed over water only, a film formation could only be observed after 30 minutes, and even after 24 hours the contents of the flask was only solid on the surface, showing there a sticky, soft mass.

This behavior of hydrogen peroxide is utilized in the present invention for the production of fast drying masses, solid dry masses, as well as solid adhesives from esters of polyvalent alcohols and unsaturated long chain fatty acids, or in general from chemical compounds containing such unsaturated long chain fatty acids. The best method found to carry out this invention for transforming the fatty acid esters into products having the improved properties, such as thickened consistency, is to disperse the fatty acid compounds in water by a process of emulsification and then bring the hydrogen peroxide in contact with the dispersed particles. According to the extent of this oxidation process, a viscous rapidly drying, for instance, solidifying or a solid dry mass, or even an adhesive, will remain after evaporation of the water or after coagulation of the dispersion.

The application of hydrogen peroxide as an oxidizing agent, preferably in a concentrated solution, allows the reaction to be carried out in the emulsified state of the oil or similar products at room temperature.

As above mentioned, products of different consistency may be secured by appropriate selection of materials and regulation of the treatment. As a guide in this connection, it is mentioned that solid and sometimes even quite hard products are secured either (a) when employing heat bodied or blown esters of fatty acids having more than one double bond, for instance, heat bodied linoleic acid esters, heat bodied or blown oils, or (b) when employing fatty oils or esters having conjugated double bonds, whether or not the materials of this group are heat bodied or blown. Examples of the latter class are tung oil, oiticica oil and dehydrated castor oil.

Considerable advantage is obtained from the employment of heat bodied oils having more than one double bond. Such heat bodying may be achieved in any of various different ways, as by heating at elevated temperature in the presence or absence of agents tending to promote heat bodying. Blown oils or esters, secured for instance by blowing air therethrough at elevated temperature, will also attain satisfactory body where it is desired to secure relatively hard or solid products.

Even in cases where the quantity of oxidizing agent added is insufficient to yield products which will display spontaneous solidification, it may nevertheless be of advantage to employ heat bodied oils or esters or esters of fatty acids having conjugated double bonds. In this event, additional oxidation may, if desired, be effected by other oxidizing agents, such for instance, as oxygen gas.

In general, these starting materials, especially heavily heat bodied oils, require less oxidizing agent for a given degree of change in consistency, thereby providing the advantage that smaller quantities of oxidizing agent may be used, with corresponding reduction in cost of materials. Moreover, the process proceeds more rapidly which is of advantage, and products of improved properties are obtained from employment of smaller quantities of oxidizing agent, since the less agent present, the less decomposition of the oil or ester takes place. The quantity of decomposition products present, therefore, may be maintained very small.

As catalysts in the process, oxidation catalysts in general may be used. I have found oxidation catalysts known for use with drying oils, as in the manufacture of varnishes, lacquers and the like, are particularly effective. For instance, heavy metal soaps may be employed, such as linoleates, resinates and naphthenates of cobalt, manganese, lead, zinc, iron and copper. Salts of such heavy metals with either organic or inorganic compounds may be employed. It is advantageous to use combinations of catalysts. These can be added either to the oil before it is dispersed or to the dispersion before or after the addition of the hydrogen peroxide.

The properties of the product can be controlled over a wide range by varying the amount of hydrogen peroxide which, as a matter of fact, reacts quantitatively and gives up the free oxygen to the drying oils or compounds containing unsaturated fatty acids. The amount and nature of the oxidation catalyst has also a marked effect on the properties of the product formed.

If water dispersions of the unsaturated fatty acid compounds are to be produced, it is important to carry out the process in such a manner that the stability is not impaired during or after the reaction. To produce stable dispersions or emulsions it is advisable to use emulsifying agents which will keep the dispersion in a stable unchanged state after the oxidation process is completed. For this purpose, the dispersing agents should be of a type such that if the formation of acidic oxidizing or decomposition products takes place, the consequent change of the pH of the dispersion will not affect the stability of the dispersion.

Agents of the type mentioned just above are disclosed in my copending application 455,607, filed August 21, 1942. In general, such agents belong to that class of materials which are non-ionic or are cation active substances, as brought out more fully in said copending application.

These agents can be added before, during or after the emulsion is made, separately or in combination with each other. Emulsifying agents belonging to the class of non-ionic substances are, for example, esters of long chain fatty acids such as nonaethylenglycolmonooleate, higher fatty alcohols such as dodecylalcohol, condensation products of polyethylenoxides. Emulsifying, stabilizing and dispersing agents belonging to the class of cation active substances are, for example, so called invert soaps, in which, contrary to anionic soaps, the long chain is attached to a positive group such as a quaternary ammonium group, or a pyridinium group, for example, duodecylammonium bromide or cetylipiridiniumbromide and similar substances.

It is furthermore desirable to work under conditions which permit no unreacted oxygen gas to escape from the reaction vessel, due to too rapid decomposition of the hydrogen peroxide. If the decomposition takes place too rapidly or suddenly, it tends to be accompanied by gas evolution which may be so rapid as to take place on the surface of the dispersion before thorough admixture with the total quantity of material to be oxidized. This may cause unwanted foaming and may also adversely influence the economy of the process.

Difficulties of this type may be avoided by operating under superatmospheric pressure which will serve not only to prevent escape of oxygen but also to decrease foaming, and in this case the pH need not be retained within any special limits.

On the other hand, instead of employing superatmospheric pressure, too rapid decomposition of the hydrogen peroxide can be avoided if the pH value of the dispersion be adjusted within certain limits mentioned below prior to addition of the oxidizing agent. Thus, I have found that if the pH value of the dispersion is properly adjusted, the oxidation may be caused to take place at a higher, or at least no lower, rate than the rate of decomposition of the hydrogen peroxide.

It was found that for the above purpose the limits are between pH 10 and pH 4. It was further found that especially good results were obtained when the pH of the dispersion to which the hydrogen peroxide is added is kept about 8.5. If the pH is more on the alkaline side, too rapid decomposition of the hydrogen peroxide will take place and unreacted oxygen gas will escape, causing considerable foaming. If, on the other hand, the pH is far on the acidic side, for example, below 4, the action of the hydrogen peroxide is slowed down to such an extent that the oxidation of the dispersed particles is negligible, even after several days. It should be understood that the optimum hydrogen ion concentration will vary within the above limits, according to the rate of combination of the drying oil or ester with oxygen.

It is also possible to reduce the amount of oxidizing agent used with the dispersion of the oil by oxidizing the oil previous to the dispersion process, or by heat-bodying the oil. Such a process can be carried out by blowing the oil with oxygen containing gases and/or heating the oil at elevated temperature.

The above process can also be carried out by passing oxygen or an oxygen containing gas through the dispersion containing a suitable liquid oxidizing agent such as hydrogen peroxide, in the presence of an oxidation catalyst. Such a process can be advantageously carried out by applying the gas under pressure which is greater than atmospheric. The oxygen containing gas and the liquid oxidizing agent, such as a solution of hydrogen peroxide in water, can be introduced simultaneously. The dispersion itself can also be kept under the same pressure as the oxidizing gas. Supplemental treatment with oxygen gas may be adopted subsequent to the treatment with hydrogen peroxide in which event a drier product may be secured.

To modify the products obtained, natural or synthetic resins, such as rosins or gums, can be dissolved in the material to be oxidized, for instance in a fatty oil or in mixed esters of unsaturated fatty acids with polybasic acids, such as phthalic or maleic acids. Furthermore, phenolic resin modified oils and the like can also be used.

Inorganic pigments, dyes and fillers can be dispersed in the oil before emulsification or oxidation. The dispersion of inorganic pigments prior to emulsification or oxidation has particular advantages, especially when employing finely divided pigments such as zinc oxide and precipitated whiting. By the dispersion of such pigments, drier and stronger products, such as films, may be secured.

Esters of the above mentioned substances with tetrahydric alcohols, such as pentaerythritol have definite advantages, i. e. they give harder and more water resistant products.

Solutions of the products to be subjected to the oxidation process or emulsions of such solutions can also be used.

In all examples the hydrogen peroxide used for oxidation was of 30% concentration by volume.

EXAMPLES

Example 1

400 parts of a dehydrated castor oil was mixed with a solution of driers as naphthanates, so the oil contained 0.3% Pb, 0.03% Co., and 0.02% Zn.

To emulsify the oil the following emulsifying agents were added: 2 parts of a polyethyleneoxide condensation product with castor oil, (a satisfactory product of this type being marketed by the General Dyestuff Corporation under the trade name of Emulphor ELA), which is a nonionic product made by condensation of polyethylenoxide with an alcohol; 1 part of cetyl dimethyl benzyl ammonium chloride (which is marketed by the Rohm & Haas Company under the trade name of Triton K-60), which is a cationic active soap, consisting of a quaternary substituted ammonia product. 200 parts of water which was mixed up with 0.5 part of an aralkyl polyether alcohol condensation product, which is a nonionic emulsifying agent (a satisfactory product of this type being marketed by the Rohm & Haas Company under the trade name of Triton NE), and 1 part of triethanolamine was stirred in the oil. The mixture was allowed to pass through a so-called colloid mill. The resulting mass was a dispersion of oil in water having rather high consistency. The pH of this dispersion was 8.7. To oxidize the product, 60 parts of a hydrogen peroxide solution of 30 volume percent active hydrogen peroxide content was mixed in slowly. The hydrogen peroxide was a stabilized commercial product, the pH of which was 6. Slight foaming was observed during the addition of the hydrogen peroxide and some heating effect. The pH of the mix after the total quantity of the $H_2O_2$ was mixed in was 6.5. 24 hours later all the $H_2O_2$ was combined with the oil and no surplus could be detected. The pH of such a mix was 4.7. After drying by evaporation of the water, a solid but soft film remained which became hard and solid by drying on the air (in a similar manner as drying oils behave when exposed to the oxidizing action of the air). By elevated temperature, this process took only 10 minutes. The temperature was 110° C. The dispersion remained unchanged for several months. After two weeks the pH was found to be 4.1.

EXAMPLE 2

400 parts of a dehydrated castor oil as above were blown with air at 180° C. for 3 hours. The dryers were added as 0.3% Pb, 0.03% Co and 0.03% Zn (calculated on the oil) and the temperature was reduced to 120° C. and the blowing with air continued for 1 more hour. To disperse the mix the temperature was reduced to 60° C. and 2 parts of a polyethyleneoxide condensation product with castor oil, (as above,) 1 part of cetyl dimethyl benzyl ammonium chloride, (as above,) and ¼ part of nonaethyleneglycolmonooleate were used. The water used for emulsification was 230 parts with 0.5 part of hydroxlethylethylendiamine dissolved. The emulsification was carried out in the usual manner. The emulsion had a pH of 8.2. For oxidation to a solid oil, only 16 parts of $H_2O_2$ solution (as above) were necessary. The pH after addition of the $H_2O_2$ was 7.1. After 24 hours standing, this reduced to 6.8. The residue was a solid film having similar properties as the film obtained in Example 1.

EXAMPLE 3

A phenolic resin modified varnish made in the usual manner, by cooking 4 gallons of China-wood oil, 16 gallons of linseed oil and 100 lbs. of a para-tertiary alkyl phenol formaldehyde condensation product type resin, said type also referred to in the literature as "pure phenolic resin," (a suitable product being marketed by the Stroock & Wittenberg Corporation under the trade name of Arofene 700) was used. Driers were added which were calculated on the fatty oil constituents of the oil. The ultimate quantity of driers were 0.3% lead, 0.02% cobalt and 0.05% manganese. For emulsifying, for every 100 parts of the varnish 2 parts of a polyethyleneoxide condensation product with castor oil, (as above,) 0.3 part of a polyethylene oxide condensation product with oleyl alcohol (a non-ionic emulsifying agent of this type being marketed by General Dyestuff Corporation under the trade name of Emulphor ON) and 0.5 part of triethanolamine were dissolved in the varnish itself. 50 parts water were used, in which 1 part of cetyl dimethyl benzyl ammonium chloride, (as above,) and 0.2 part of an alkyl dimethyl benzyl ammonium chloride, a quaternary ammonium salt (a suitable product being marketed by the General Dyestuff Corporation under the trade name of Zephiran) were dissolved. All the other ingredients are identical with those used in the previous examples. The parts are calculated on the varnish content of the dispersion. After the emulsification process, the pH of the dispersion was 8.2. For oxidation 100 parts of the 67% dispersion were slowly mixed with 16 parts of 30 volume percent hydrogen peroxide solution. After the reaction was completed, the pH of the dispersion was 7.5. After evaporation of the water at room temperature a solid, strong elastic film remained.

EXAMPLE 4

A batch of a chemically treated alkali refined linseed oil was employed in this example, said oil being a maleic anhydride modified linseed oil. To the batch naphthanate driers were added, in quantities giving metal content on the basis of the oil as follows: 0.24% lead, 0.048% cobalt, and 0.018% manganese.

An aqueous dispersion of the oil containing the driers was then made up of the following parts (by weight):

100 parts with maleic anhydride chemically treated linseed oil (containing the metal driers)
2.5 parts a polyethyleneoxide condensation product with oleyl alcohol (as above) (preliminarily dissolved in the oil)
1 part an alkyl dimethyl benzyl ammonium chloride, a quaternary ammonium salt (as above)
45 parts of water (in which 0.4 part of triethanolamine was dissolved)

Ten parts of hydrogen peroxide were added to the dispersion. After standing for twenty-four hours, apparently no surplus of hydrogen peroxide remained, and at this time a liquid product was secured upon evaporation of water from a test sample.

Five additional parts of hydrogen peroxide were added, which apparently were not absorbed by the oil, since a surplus was present even after forty-eight hours standing. A film produced from this dispersion remained liquid after evaporation of the water, but upon further drying in air, the film solidified very rapidly, showing wrinkle formation. The pH of the dispersion was 4.7.

Although surplus hydrogen peroxide was present, liquid films were still produced from test samples made even after the dispersion had stood for sixty days.

Similar liquid products and films were obtained by the same general procedure when using various other oils, including maleic anhydride modified soya bean oils, sardine oil, and alkali refined linseed oil.

All of the oils just mentioned, as well as the maleic anhydride modified linseed oil indicated that oxidation took place by treatment with hydrogen peroxide, this being indicated by disappearance of hydrogen peroxide and also by production of decomposition products of acidic nature. With all of these oils liquid products were obtained.

EXAMPLE 5

The effect of increasing the quantities of driers is indicated by this example.

Here a batch of a maleic anhydride modified linseed oil was also employed, being mixed with driers as naphthanates, giving 1.0% lead, 0.1% cobalt, and 0.1% manganese on the basis of the oil.

A dispersion was then produced, for which purpose the ingredients were prepared in two batches, the batches thereafter being intermixed.

*First batch*

50 parts of oil (containing the driers)
2 parts a polyethyleneoxide condensation product with castor oil (as above)
2 parts nonaethyleneglycolmonooleate

*Second batch*

20 parts water
0.2 part triethanolamine
0.1 part cetyl dimethyl ammonium chloride (as above), a nonionic emulsifying agent After combining the two batches to form the dispersion, the pH of the dispersion was 7.7.

Ten parts of hydrogen peroxide were then added. Slight foaming and some heating effect were noticeable, and apparently no excess of hydrogen peroxide remained in the dispersion. The pH after this addition was 5.35. A test sample produced a product of liquid consistency after evaporation of the water.

A further ten parts of hydrogen peroxide were added and at this time considerable heating was noticeable. Moreover, excess hydrogen peroxide apparently remained in the dispersion, and the pH was reduced to 4.55.

Samples tested at this time also indicated a film of liquid consistency after evaporation of the water, although the film dried very rapidly to a solid film in the air.

After standing for thirty days the pH was found to be 3.9, with excess hydrogen peroxide still present. At this time also the dispersion yielded a liquid product which dried very rapidly upon evaporation of the water. No wrinkle formation was noticeable.

EXAMPLE 6

A batch of 100 parts of a dehydrated castor oil was milled on a paint mill with thirty-one parts of zinc oxide. Driers, as naphthanates, were then added, giving 0.07% lead, 0.03% cobalt and 0.03% zinc.

A dispersion was then produced, the constituents being prepared in two batches which were subsequently combined:

*First batch*

130 parts of the above mixture of oil, zinc oxide and driers
2 parts a polyethyleneoxide condensation product with castor oil (as above)
1 part cetyl dimethyl benzyl ammonium chloride (as above)
1 part Emulphor ON

*Second batch*

60 parts water
1 part an aralkyl polyether alcohol condensation product (as above)

After mixture of the two batches and forming the dispersion therewith, one part triethanolamine was added to the dispersion. This dispersion was of the water-in-oil type which was converted to the oil-in-water type by the addition of seventy parts of water in which four parts of morpholine and two parts of a polyethyleneoxide condensation product with oleyl alcohol (as above) were dissolved. The pH of the dispersion was 8.9.

Ten parts of hydrogen peroxide were then added, and a test sample indicated a relatively hard solid, with a dry surface, after evaporation of the water.

Similar procedure was followed but without incorporating zinc oxide in the oil. This yielded a solid product which product, however, was rather soft and had a somewhat sticky surface.

EXAMPLE 7

A batch of linseed oil was heated at from 300 to 350° C. until it became quite viscous and until a film (containing 0.3% lead and 0.15% cobalt) yielded a solid film in two hours at room temperature.

Following this initial stage of heating, the batch of oil was then subjected to air blowing for two hours at 100° C. Thereafter an aqueous emulsion was prepared as follows:

330 parts of the blown linseed oil
3 parts triethanolamine
3.3 parts of dioctyl ester of sodium sulfo-succinic acid (a suitable product of this kind being marketed by the American Cyanamid Company under the trade name of Aerosol OT)
150 parts of a 1% aqueous casein solution A test sample from the above dispersion indicated that the product did not dry as rapidly as the oil which was not dispersed.

Some hydrogen peroxide was then added to a portion of the foregoing dispersion, and during addition of the hydrogen peroxide coagulation took place, the coagulum being a solid mass. This portion contained only an anion active stabilizing agent.

Another portion of the foregoing dispersion was then taken and employed as a batch for additional treatment. To improve the stability of the dispersion there was added five parts of water on the basis of 100 parts of the batch now being used, in which water there were dissolved non-ionic stabilizing agents, i. e., one part of a polyethyleneoxide condensation product with castor oil and 0.5 part of a polyethylene oxide condensation product with oleyl alcohol (both as above). Twenty parts of hydrogen peroxide were then slowly added and immediately after this addition some foaming could be observed although heating was not noticed. The foaming continued for some time while the mixture stood at room temperature. The dispersion contained large quantities of unchanged hydrogen peroxide. The product secured after evaporation of the water was a sticky solid which lost its stickiness in about two hours.

The reaction of the dispersion was acidic, the pH thereof being 4.8 after standing for 48 hours.

After about five days the pH was reduced to about 3.75 and at this time the dispersion coagulated, giving a coherent solid mass.

I claim:

1. A process in accordance with claim 9 in which the pH value of the dispersion during the oxidation is about 8.5.

2. A process in accordance with claim 9 in which the emulsion being oxidized also contains an inorganic pigment, which has been incorporated into the ester prior to the preparation of the aqueous emulsion.

3. A process in accordance with claim 9 in which the emulsion being oxidized also contains zinc oxide, which has been incorporated into the ester prior to the preparation of the aqueous emulsion.

4. A process in accordance with claim 9 in which the ester selected for emulsification and oxidation comprises a drying fatty oil.

5. A process in accordance with claim 9 in which the ester selected for emulsification and oxidation comprises an ester formed with a tetrahydric alcohol.

6. A process in accordance with claim 9 in which the ester selected for emulsification and oxidation comprises a partially polymerized drying fatty oil.

7. A process in accordance with claim 11 in which said ester is a bodied drying fatty oil.

8. A process in accordance with claim 9 in which the ester selected for the emulsification and oxidation comprises an ester of a fatty acid having conjugated double bonds in the fatty acid radical.

9. A process for producing stable aqueous oil-in-water emulsions of thickened esters, which process comprises emulsifying in water by the aid of an emulsifying agent a polyhydric alcohol ester of a polyunsaturated long chain fatty acid, to form an oil-in-water emulsion and subjecting the emulsified particles to oxidation with hydrogen peroxide in the presence of a drier, the emulsion, during oxidation, having a pH value between about 4 and 10, and the oxidation being continued until the ester is appreciably thickened.

10. A process for producing stable aqueous oil-in-water emulsions of thickened esters, which process comprises emulsifying in water by the aid of an emulsifying agent a polyhydric alcohol ester of a polyunsaturated long chain fatty acid, to form an oil-in-water emulsion and subjecting the emulsified particles to oxidation with hydrogen peroxide in the presence of a drier, the emulsion, during oxidation, being maintained under super-atmospheric pressure, having a pH value between about 4 and 10, and the oxidation being continued until the ester is appreciably thickened.

11. A process for producing stable aqueous oil-in-water emulsions of thickened esters, which process comprises emulsifying in water by the aid of an emulsifying agent a polymerized polyhydric alcohol ester of a polyunsaturated long chain fatty acid, to form an oil-in-water emulsion, and subjecting the emulsified particles to oxidation with hydrogen peroxide in the presence of a drier, the emulsion, during oxidation, having a pH value between about 4 and 10, and the oxidation being continued until the ester is appreciably thickened.

PAUL STAMBERGER.